(No Model.) 2 Sheets—Sheet 1.
W. W. KNOWLES & W. H. HITCHCOCK.
Method of Manufacturing Clip King Bolts.
No. 237,550. Patented Feb. 8, 1881.
Fig. 1.
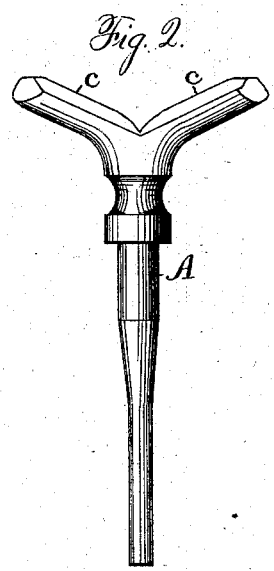
Fig. 2.
Fig. 3.
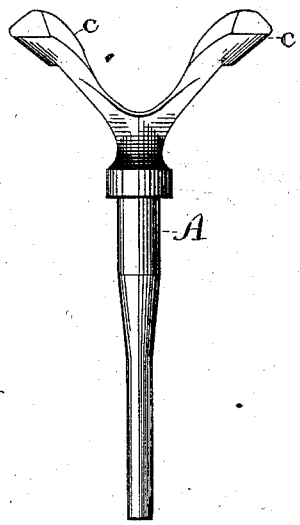
Fig. 4.
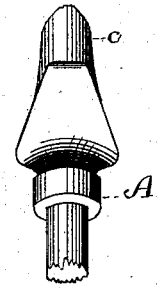
Fig. 5.
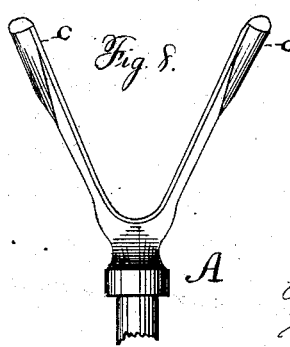
Fig. 6.
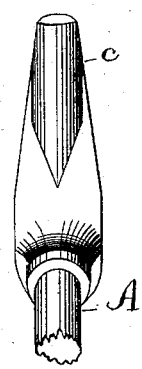
Fig. 7.
Fig. 8.
Witnesses.
John Edwards Jr.
A. W. Stanley
Inventor.
Wilson W. Knowles
William H. Hitchcock
By James Shepard Atty.

(No Model.) 2 Sheets—Sheet 2.

W. W. KNOWLES & W. H. HITCHCOCK.
Method of Manufacturing Clip King Bolts.

No. 237,550. Patented Feb. 8, 1881.

Witnesses.
John Edwards Jr.
A. W. Stanley

Inventor.
Wilson W. Knowles
William H. Hitchcock
By James Shepard atty

UNITED STATES PATENT OFFICE.

WILSON W. KNOWLES, OF PLANTSVILLE, AND WILLIAM H. HITCHCOCK, OF MILLDALE, ASSIGNORS TO HENRY H. CLARK, CHAS. H. CLARK, ROBERT W. BEMISS, AND WILLIAM H. CUMMINGS, OF MILLDALE, CONNECTICUT.

METHOD OF MANUFACTURING CLIP KING-BOLTS.

SPECIFICATION forming part of Letters Patent No. 237,550, dated February 8, 1881.

Application filed June 9, 1880. (No model.)

*To all whom it may concern:*

Be it known that we, WILSON W. KNOWLES, of Plantsville, in the county of Hartford and State of Connecticut, and WILLIAM H. HITCHCOCK, of Milldale, in the same county and State, have invented certain new and useful Improvements in the Manufacture of Clip King-Bolts, of which the following is a specification.

The objects of our invention are to facilitate the manufacture of clip king-bolts, so that they may be produced economically and with a wide clip without flaws or "cold-shuts."

Figure 9:
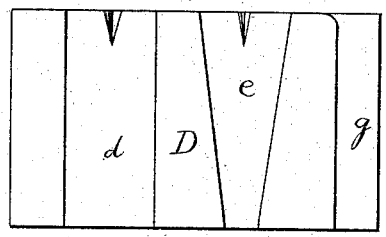
Figure 10:
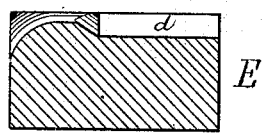
Figure 11:
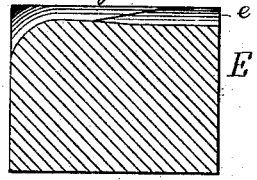
Figure 12:
Figure 12:
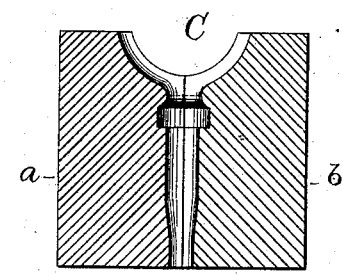
Figure 13:
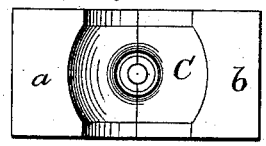

In the accompanying drawings, Figure 1 is a side elevation of the blank which is the result of the first step in our manufacture. Fig. 2 is a front elevation of the blank which is the result of the second step. Fig. 3 is a side elevation of the same, looking directly or square upon the side of one arm and cornerwise upon the shank or body of the bolt. Figs. 4 and 5, respectively, are front and side views of the blank which is the result of the third step. Figs. 6 and 7, respectively, are like views of the blank which is the result of the fourth step. Fig. 8 is a front elevation of the blank which is the fifth and last step. Fig. 9 is a plan view of the under side of the upper die and top of the under die which we employ for forging the blank which is the result of the third step, Figs. 4 and 5, into the fourth blank, Figs. 6 and 7. Figs. 10 and 11 are vertical sections of the lower die on lines $x\,x$ and $y\,y$, respectively. Fig. 12 is a side elevation of the punch or header and a vertical section of the die employed for forging the blank which is the result of the second step, Figs. 2 and 3, into the third blank, Figs. 4 and 5; and Fig. 13 is a plan view of said die.

The shank or body A of the bolt may be of any desired form. We first form this in dies under a drop or trip hammer and cut it off from the bar, leaving the form as represented in Fig. 1. The upper end of this blank is then split into the form substantially as shown in Figs. 2 and 3. Thus far the steps are the same as heretofore employed. The forked blank, Figs. 2 and 3, is then struck by the header B and divided die C, Figs. 12 and 13, to throw it into the form shown in Figs. 4 and 5. The header B is rounded, as shown in Fig. 12, upon its end into a semi-cylindrical form, and the sides above said semi-cylindrical face are vertical, and the whole is surmounted by a round or other form of shank by which to secure the header in the heading-machine. The semi-cylindrical face of the lower end of the header B is its only face for acting upon the blanks.

The die C is made in two parts, *a* and *b*, so that it may be opened to receive the body A of the king-bolt. The upper or anvil portion of this die is U-shaped in side view, but is slightly rounded out or recessed in the middle to impart a rounded form to the outside face of the arms at their junction with the body of the bolt, and for a short distance upward.

In order to properly spread the stock and get sufficient width at the base of the arms *c c*, which are to form the arms of the clip, a powerful pressure must be brought to bear upon the header, and the parts of the die must be firmly held together. We find a machine quite similar to an ordinary bolt-heading machine best adapted for this purpose, and we arrange the header so as to move horizontally. The die is also held in its closed position by means of a wedge, as in bolt-heading machines.

When the dies are open we place the split blank, Figs. 2 and 3, therein with its body A resting in the correspondingly-formed groove through said die. The wedge then advances to close the die and firmly hold the blank, after which the header advances and is forced in between and against the divided portion of the blank and upsets the metal, spreading it out and leaving it in the form shown in Figs. 4 and 5. This blank is then operated upon, one arm at a time, under the drawing-dies D E, placed in any suitable hammer or drop. Each arm is placed between the grooves $d\,d$ to draw it flatwise, and between the tapering grooves $g\,g$ to draw it edgewise or smooth the edge. These edging-grooves are not shown, except in Fig. 9; but it is considered unnecessary to further represent them, as they are substantially like the edging-grooves of numerous dies, and their taper in this case corresponds substantially to the taper of the arms, *c c*, finished in them, as represented in Fig. 7.

The groove *d* in the lower die, E, is deeply recessed on the back side, as shown most clearly in Fig. 10, so that only the small elevated portion $h$ in said groove operates upon the iron, and thereby it is drawn out faster than it would be if a large flat surface were struck at one time. After the arm has been drawn out sufficiently between the grooves $d$ $g$ it is struck between the grooves $e\ e$ to give it the final form. The other arm is then operated upon in like manner, thereby producing the nearly-completed blank king-bolt, which is the result of the fourth step, and is shown in Figs. 6 and 7. These king-bolts may be sold to carriage-makers in this form, Figs. 6 and 7, if desired; but we prefer to bend the arms up into the form shown in Fig. 8. This can be done by bending over a round-nosed tool or horn; and, if desired, it may be struck again by the header B when in the dies C and the heading-machine, or by dies similar to C and header B, specially reserved for finishing. The other parts may also, if desired, be further operated upon for the sake of obtaining a smooth and neat finish.

Although the blanks Figs. 1 and 2 are old, most, if not all, of the patented processes and dies for making clip king-bolts do not form the groove or neck under the arms until after the clip-arms have been formed, and consequently the form of the bolt at the junction of the arms and neck cannot be given by the holding-die and simultaneously with the heading operation.

In our process the finish or substantially the final form of the king-bolt at and a little above the junction of the arms and neck is given by the anvil part of the holding-dies C. In order to do this effectually great pressure is required, and to hold the bolt properly within the die we make it fit the shank through its whole length. In this connection it is essential that the die C shall extend upward above the junction of the arms and neck of the king-bolt far enough to confine the stock around the anvil portion of the die, so that it may be upset under the action of the header into the ordinary final form which is given to it by the form of the anvil-surface of the die C, which we believe has not been the case in any prior process.

While it is essential that the anvil-surface of the die C shall extend upward above the junction of the arms and neck, it is equally essential that it and the header shall be so formed as not to embrace the arms proper to any greater extent and operate to spread the metal in said arms, because, first, it would make so much surface to be operated upon that it would be impracticable to properly force the metal into the die so as to fill it and properly form the blank or king-bolt around the base of the arms, and, second, because it is essential to our process that the arms shall be formed by an operation which is subsequent to forming the junction of the arms and neck by means of the die C and header B. The shape of this anvil-surface is left upon the under side of the arms and the neck under it for a little above the junction of said arms and neck, which shape is the final form of that part of the king-bolt.

We are aware that clip king-bolts have been heretofore made by following the first two steps of our process and then finishing by other modes; also, that forked blanks have been formed into the arms of clip king-bolts in solid V-shaped dies, also in solid flat dies, the neck in each case being formed under the arms afterward; also, that a divided die somewhat similar to the die C, but which, with the upper die, embraced the major portion of the arms, has been shown in a prior patent, and described therein as for use in bending the arms to "set" them after their substantial final form (except merely bending) had previously been given to said arms and to their junction with the neck, and when said dies were employed to finish the king-bolt, instead of, as in our process, to operate upon a blank preparatory to a subsequent operation; also, that drawing and shaping dies somewhat similar to the dies D E have been used in forging the arms of clip king-bolts, all of which we hereby disclaim.

By our process the king-bolt is formed in a much neater and perfect form at the junction of the arms and neck, with wide arms at the base, although formed from a round blank, and without any flaws or cold-shuts, while at the same time the process for producing the king-bolts is as inexpensive as any prior process.

We claim as our invention—

1. That improvement in the art of making clip king-bolts which consists of the progressive formation thereof by throwing the stock into the succession of forms as specified, and represented in Figs. 1 to 7, inclusive, of the drawings.

2. That improvement in the art of making clip king-bolts which consists of holding the forked blank, Figs. 2 and 3, in a divided die, C, in a heading-machine, by firmly griping the shank of said blank in said die and operating upon the middle portion of said blank by means of the semi-cylindrical face of the header B, to throw the stock into the form shown in Figs. 4 and 5, substantially as described.

3. That improvement in the art of making clip king-bolts which consists of holding the forked blank, Figs. 2 and 3, in a divided die, C, in a heading-machine and operating upon the same by means of the semi-cylindrical face of the header B, to throw the stock into the form shown in Figs. 4 and 5, then drawing out and shaping the arms into the form shown in Figs. 6 and 7 by means of the dies D and E, substantially as described.

WILSON W. KNOWLES.
WILLIAM H. HITCHCOCK.

Witnesses:
A. M. LEWIS,
W. H. CUMMINGS.